United States Patent [19]

Braun et al.

[11] 3,912,877

[45] Oct. 14, 1975

[54] ELECTRICAL COMMUNICATION SWITCHING NETWORK PROVIDING FAR-END CROSSTALK REDUCTION

[75] Inventors: Arthur Rechtman Braun, Naperville; Clarence Newton Johnson, Chicago; Rein Raymond Laane, Wheaton, all of Ill.

[73] Assignee: Bell Telephone Laboratories, Incorporated, Murray Hill, N.J.

[22] Filed: Mar. 20, 1974

[21] Appl. No.: 452,935

[52] U.S. Cl. .......................................... 179/80; 333/1

[51] Int. Cl.$^2$ .......................................... H04M 1/74

[58] Field of Search ......... 179/18 GE, 18 GF, 18 G, 179/78 R, 80; 333/1

[56] References Cited

UNITED STATES PATENTS

| | | | |
|---|---|---|---|
| 2,943,272 | 6/1960 | Feldman | 333/1 |
| 3,688,051 | 8/1972 | Aagaard | 179/18 GF |
| 3,720,792 | 3/1973 | Resta | 179/18 GF |
| 3,789,151 | 1/1974 | Richards | 179/18 GF |

*Primary Examiner*—Thomas W. Brown
*Attorney, Agent, or Firm*—W. H. Kamstra

[57] ABSTRACT

A high impedance to low impedance transmission network in which an effective negative impedance is introduced at the demodulator end to achieve a further significant reduction in far-end crosstalk. The effective negative impedance is implemented by a feedback circuit for shifting the signal voltage at the far end of the network in a direction opposing the phase of the voltage at the high impedance end of the network. The net impedance seen from the latter end remains positive with the result that normally encountered instability problems attendant the use of negative impedance circuits are avoided.

10 Claims, 3 Drawing Figures

ELECTRICAL COMMUNICATION SWITCHING NETWORK PROVIDING FAR-END CROSSTALK REDUCTION

BACKGROUND OF THE INVENTION

This invention relates to communication switching systems and more particularly to networks for establishing transmission paths between input and output circuits of such systems. The term "communication switching systems" is here meant to include, for example, telephone switching systems (both those systems employing analogue information transmission and those systems employing digital information transmission), telegraph switching systems, data switching systems, and the like.

An important part of every communication switching system comprises the switching network for selectively interconnecting transmission paths between the communication lines served by the system. The line and trunk circuits associated with a telephone system, for example, have generally been connected directly to the system's terminals and transmission through metallic crosspoint devices of the network has been between input and output circuits exhibiting substantially identical impedance characteristics. That is to say, the output impedance of a circuit connected to the input terminals of a transmission path through the crosspoint devices and the input impedance of a circuit connected to the output terminals of that transmission path have been substantially matched. Such arrangements minimize signal reflections and are particularly suited to transmission paths which approach significant fractions of the wavelengths of the highest transmitted signal frequency in length. They are, however, also particularly subject to crosstalk when employed with unbalanced transmission paths. Accordingly, large communicating switching systems have historically employed networks presenting balanced transmission path through crosspoint switching devices in order to minimize capacitive and inductive crosstalk between paths. This crosstalk reduction is realized, however, at the cost of requiring at least two crosspoint devices for every appearance of a transmission path in a network stage. The balanced path approach has also been less than the ideal solution to the crosstalk problem when semiconductor devices such as thyristors are employed as crosspoints in the network. These crosspoint devices are not generally isolated electrically from their operating circuits and present a relatively large capacitance during the "off," or nonconducting, state, thereby further aggravating the crosstalk problem.

One highly advantageous prior art solution to the crosstalk problem in switching networks and one which makes use of unbalanced transmission paths therethrough is described in U.S. Pat. No. Re 27,798 of R. R. Laane issued Oct. 30, 1973. In the network arrangement there described, past problems encountered in the use of unbalanced transmission paths through either metallic or semiconductor crosspoints are overcome by deliberately and drastically mismatching the impedances at opposite ends of each crosspoint transmission path (as seen from the crosspoint) in such a manner that signal transmission through the crosspoint, instead of taking the form of normal current and voltage variations, involves relatively large current variations but only very small voltage variations. In particular, a coupling network is provided between the input transmission path and the crosspoint which presents to the crosspoint an impedance which is large in comparison to the impedance of the input and output transmission paths and a coupling network is provided between the crosspoint and the output transmission path which presents to the crosspoint an impedance which is small in comparison to the impedance of the input and output transmission paths. Because of the resulting division of voltages, transmission sensitivity to crosspoint impedance is drastically reduced and isolation from inductive crosstalk is significantly improved. At the same time, because of the greatly reduced voltage variations, capacitive crosstalk from both crosspoint capacitance and normal capacitive coupling between transmission paths is similarly lessened. By operating the transmission paths in an unbalanced mode, an important saving is also realized in that the number of crosspoint devices for each path is halved.

The foregoing solution, although advantageously meeting the crosstalk problem within a switching network stage, is not, however, the complete answer to crosstalk appearing elsewhere in the network. Crosstalk generated between interstage junctor cables, for example, may in some cases impose severe limitations on both cable length and frequency. Crosstalk increases as path length increases and due to inherent coupling, both electrostatic and electromagnetic, of unbalanced lines, junctor cable length in one particular network system, for example, at voice frequencies was limited to 400 feet when the idle transmission paths were grounded and to 250 feet when the latter paths were ungrounded. At higher frequencies the junctor cable length was reduced even further. In one network arrangement such as discussed in the foregoing, this coupling and the resulting crosstalk was reduced by inserting impedance isolators in the junctor paths in order to reduce the equivalent series resistance in long cable segments. The employment of such isolators is, however, less than the optimum approach, being both costly and cumbersome in that one isolator stage per junctor cable is required for each interstage connection.

It is accordingly one object of this invention to reduce crosstalk between interstage junctor cables in communication switching networks.

Another object of this invention is to remove the limitations on interstage junctor cable lengths in communicating switching networks.

A further object of this invention is to improve the crosstalk characteristics of unbalanced switching networks.

It is also an object of this invention to achieve a new and improved telecommunication switching network.

SUMMARY OF THE INVENTION

The foregoing and other objects of this invention are realized in one illustrative switching network arrangement which presents a novel departure from the high impedance to low impedance network described in the patent of R. R Laane referred to in the foregoing. A specific embodiment is there disclosed comprising high impedance outputs of a modulator stage connected between system input circuits and a first stage switching crosspoint network. Output terminals of the latter are connected via junctor cables to the input terminals of a second stage crosspoint network having connected to its output terminals the low impedance inputs of a demodulator stage. Outputs of the demodulator stage are connected to the system output circuits. The modulator and demodulator stages include impedance converter transistors which match the impedance of the transmission paths of the network to the incoming and outgoing transmission lines. Coupled in each of the network interstage junctor cables is a pair of impedance isolator transistors which buffer the connecting transmission cable paths from the two network stages. The insertion of the impedance isolators in the prior art arrangemnet has the effect of at least reducing the equivalent series resistance in longer junctor path segments in dealing with the crosstalk problem.

In accordance with the present invention the expense and limitations of the resort to impedance isolators is obviated by adding what may be termed a negative impedance to each disturbing (i.e., transmitting) network path at the receiving demodulator end. Consider two adjacent network paths, a disturbing path which induces crosstalk and a disturbed path in which the crosstalk is induced. As a signal current is transmitted via the disturbing path to a load at its terminus, a portion of the current, i.e, the crosstalk current, will be induced in the disturbed path as a result of the distributed capacitance between the two paths. The voltage at the receiving end of the disturbing path which is at ground potential will normally be very near zero. In order to reduce the total current lost by the disturbing path to zero, the voltage at the receiving end is made equal in magnitude to that at the originating end but it shifted to be substantially 180° out of phase with the latter. As a result, although the crosstalk mechanism—the capacitive coupling between the two paths— is still present, it is rendered ineffective to disturb an adjacent path.

The circuitry by means of which the voltage phase shift is accomplished, although not a true negative impedance, effectively operates as such. A feedback circuit is provided at the impedance converter transistor at the demodulator end of a disturbing network transmission path, which circuit includes the collector and base circuits of the transistor. An output taken from the converter transistor, high impedance collector is shifted 180° by a phase shift network and applied to a load impedance connected between the transistor base and ground. Because the base impedance is relatively high, the largest portion of the current will pass through the added load impedance. A potential will thus be applied to the transistor base (and thus will appear at the path-connected emitter) equal to the value of the current times the load impedance. This potential substantially equals the potential at the originating end of the transmission path and having been phase shifted 180° therefrom, results in a substantially zero transfer of current from the disturbing path to the disturbed transmission path. The load impedance added comprises a parallel network consisting of a resistance equal to the source impedance at the modulator input end of the path, a capacitance equal to the sum capacitance to ground of the path and the mutual capacitance between the disturbing path and any other path with which crosstalk is to be reduced. The parallel network also includes a branch having a series connected inductance equal to the inductance of the modulator to demodulator link and a resistance which equals the sum resistances of the crosspoints of the switching networks.

In the foregoing it was suggested that a true negative impedance in the commonly accepted meaning of the term is not employed in the practice of this invention. In a true negative impedance arrangement the total impedance of the transmission path would have a negative value or at least not rise above zero. In the present invention it is contemplated that the sum impedances presented by the transmission path and the feedback circuitry will have some positive value. advantageously, as a result, past considerations raised in connection with negative impedance circuits such as circuit stability and oscillation, for example, do not apply in the operation of this invention. Further, the quality of transmission through the path is not affected since the circuitry of this invention is not directly interposed in the transmission path.

It is accordingly a feature of this invention that feedback circuitry is provided at the demodulator end of a communication network transmission path to shift the voltage at that end 180° out of phase with the voltage at the originating, modulator end of that path to effectively cancel any currents induced in an adjacent path due to capacitive coupling between the paths. Advantageously, feedback circuitry according to this invention is particularly applicable to networks having unbalanced transmission paths therethrough in which the impedances at opposite ends of each path are deliberately mismatched as seen from the crosspoint elements of the network. As a result, the length of junctor cable lengths between network stages and frequency range may be substantially extended without the normal risk of increasing far-end capacitive crosstalk.

BRIEF DESCRIPTION OF THE DRAWING

The foregoing and other objects and features of this invention will be better understood from a consideration of the detailed description of the organization and operation of one illustrative embodiment thereof which follows when taken in conjunction with the accompanying drawing in which.

DETAILED DESCRIPTION

Figure 1:
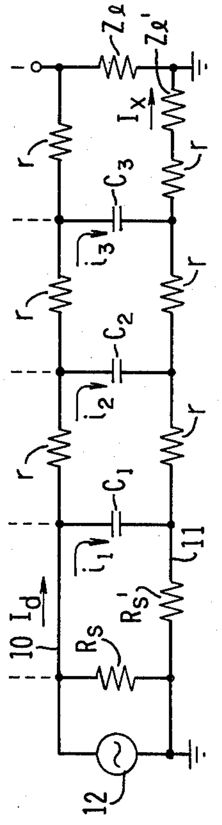
FIG. 1 is a schematic diagram of a crosstalk model based on lumped elements demonstrating the source of the problem to which this invention is directed and the manner in which the problem is overcome.

A circuit model of the crosstalk mechanism with which this invention is concerned is shown in FIG. 1 and represents two adjacent transmission paths 10 and 11, both end grounded. Since this invention involves only the contribution of the electrostatic mechanism, only elements of the latter are represented, the electromagnetic mechanism becoming an important consideration only beyond the voice frequency range. Each of the paths includes a plurality of resistors $r$ representing the lumped resistances of the network crosspoints and those of the connecting links and junctors. Connected between the two paths is a plurality of capacitors $c_1$, $c_2$, and $c_3$ representing the lumped capacitive coupling between the paths. Path 10 is shown as originating at a signal source 12 with source impedance $R_s$ and terminating at a load $Z_l'$; path 11 will source impedance $R_s'$ is shown as terminating at a load $Z_l'$. In this model, path 10 is the disturbing path and path 11 is the path disturbed; accordingly, a current $I_d$ is assumed as being transmitted from generator 12 via path 10 to be applied to load $Z_l$. As a result of the capacitive coupling represented by the capacitors $c_1$, $c_2$, and $c_3$, portions of the current $I_d$ will normally be shunted by these capacitors' paths as indicated in the figure as current $i_1$, $i_2$, and $i_3$, respectively, to appear as a sum crosstalk current $I_x$ at the load $Z_l'$ of path 11. As the current $I_d$ traverses path 10, the voltage appearing at the originating end decreases in value to substantially zero at the grounded receiving end. This is graphically depicted in associated FIG. 2 where voltage magnitude is plotted against distance of the transmission path, the voltage magnitude being represented by line 20. It is apparent from the graph of FIG. 2 that the currents in the capacitor paths also progressively decrease in magnitude as the voltage across these points decreases. It will further be appreciated that, if the currents in the capacitor paths could be made to cancel out, the sum crosstalk current $I_x$ would also be reduced to zero.

Figure 2:
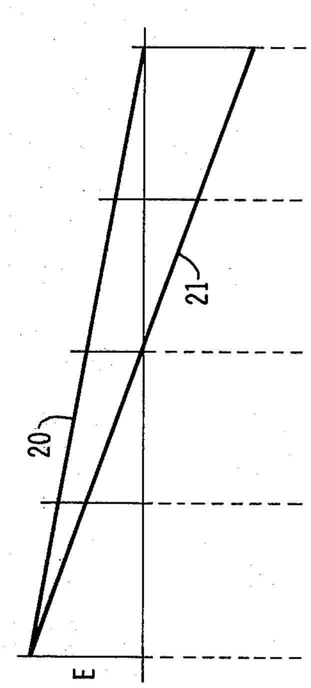
FIG. 2 is a graph associated directly with the circuit model of FIG. 1 depicting voltage magnitudes in the latter model under prior art conditions as contrasted with voltage magnitudes in a circuit in accordance with the principles of this invention.

This is accomplished in accordance with the principles of this invention by rendering the currents $c_1$ and $c_3$ equal in magnitude but opposite in direction and by reducing the current $c_2$ to zero. The voltage at the receiving end is shifted 180° out of phase with that at the originating end with the voltage having a zero magnitude at the point of capacitor $c_2$ path. This voltage shift is depicted in the graph of FIG. 2 by the line 21 which also demonstrates the equality of the absolute voltage values at the two ends of the transmission path. It will also be apparent that as the voltage magnitude falls to zero and increases negatively, current in the capacitor $c_2$ path also falls to zero and the currents in the capacitor $c_1$ and $c_3$ paths reverse in direction and approach equality in magnitude with the sum of the currents in these paths thus being zero, that is, crosstalk current $I_x$ becomes zero.

Figure 3:
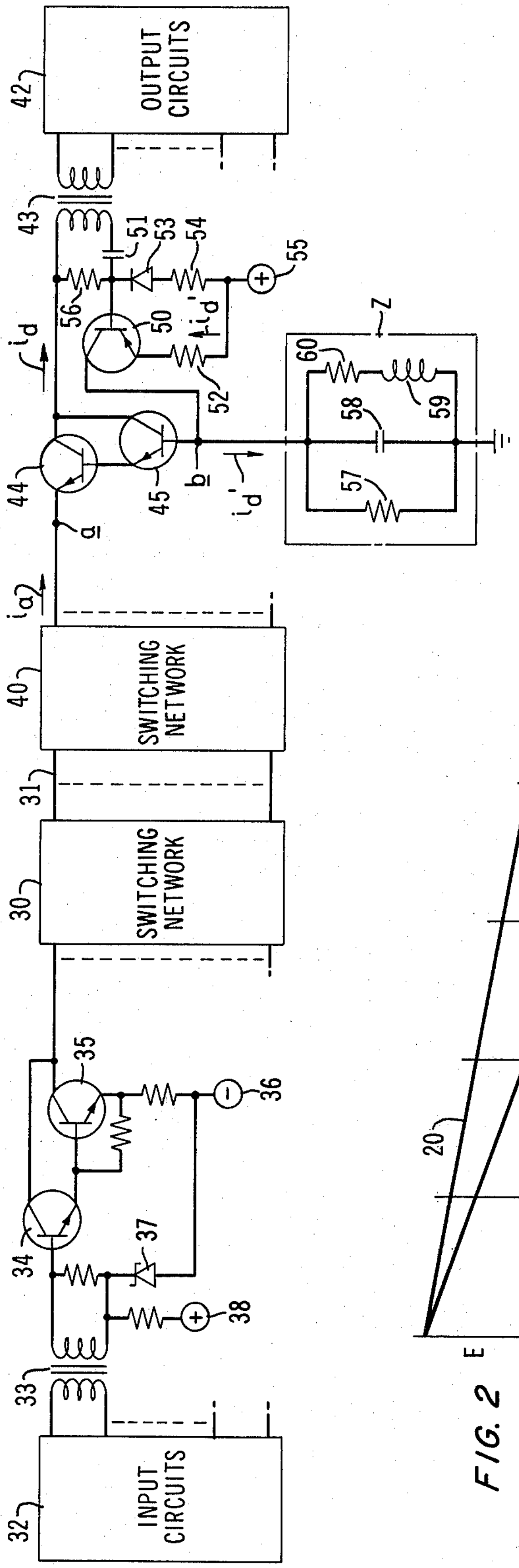
FIG. 3 is an alternating current equivalent circuit diagram of an illustrative communicating switching network according to this invention.

With the foregoing background discussion in mind, one specific circuit implementation of the principles of this invention may now be considered with particular reference to FIG. 3. An alternating current equivalent circuit is there depicted which comprises a pair of unbalanced switching networks 30 and 40 fof selectively establishing a plurality of transmission paths therethrough. These paths are conventionally selectively established and defined by crosspoint switches which, within the scope of this invention, may typically be either of the semiconductor or the metallic contact kind. The networks 30 and 40 are interconnected by a plurality of directly connected junctors 31. The network 30 operates to connect a selected one of the latter with one of a plurality of input circuits 32. The circuits 32 in the context of a communication switching system may comprise input transmission lines or trunks and need not be further described for an understanding of this invention. The connection between a terminal of switching network 30 and an input circuit is made via a transformer 33 having a secondary winding connected to the base of a first transistor 34 which has its collector connected to the collector of a second transistor 35 and to a terminal of network 30. Transistors 34 and 35 are connected in a conventional Darlington configuration. The bases of these transistors are connected to a source of negative potential 36, that of the transistor 34 through a Zener diode 37. One end of the secondary winding of transformer 33 is connected to a source of positive potential 38.

The network 40 operates to connect a selected one of the junctors 31 with one of a plurality of output circuits 42, which latter circuits may, similarly to the input circuits 32, comprise output transmission lines or trunks the details of which also need not be here considered. The connection between a terminal of network 40 and an output circuit is made via a transformer 43 having a primary winding connected to the collectors of a first and second transistor 44 and 45 also connected in a Darlington configuration. The emitter of transistor 44 is connected directly to a terminal of network 40. Transistor pairs 34–35 and 44–45 operate as impedance converter circuits in accordance with the principles of the invention of R. R. Laane described in the patent cited hereinbefore. As there described, the collectors of transistors 34 and 35 present a virtually infinite impedance to the path established through the networks 30 and 40 as seen from the crosspoint switches. At the other end of the system, the emitter of transistor 44 presents effectively a zero impedance to the path as seen from the crosspoint switches. Each of the input and output circuits 32 and 42 is assumed to present to the converter circuits a typical impedance of 600 ohms. As a result of the impedance conversions thus performed, the networks 30 and 40 are driven by a high impedance source and any crosspoint impedance will not force changes in the transmitted signal level. Further, since the transmission path through the network is terminated in a low output impedance, capacitive crosstalk isolation between two network paths is greatly increased. A detailed description and circuit analysis of the elements of a network system so far considered, such as the effect and advantages of the use of Darlington transistor circuits, mismatching of impedances and its effects., etc., is found in the patent of Laane referred to in the foregoing and, to the extent applicable, that description is incorporated herein by reference.

According to one aspect of the present invention, feedback circuitry is provided at the receiving terminus of a transmission path comprising a PNP transistor 50 having its base connected to one end of the primary winding of transformer 43 through a capacitor 51, the collector being connected as a feedback path to the base of transistor 45. The base-emitter circuit of transistor 50 includes a resistor 52 connected in a parallel circuit arrangement with a series diode 53 and resistor 54 connected to a source of positive potential 55. The base of transistor 50 is also connected to the collector of transistor 45 via a resistor 56. A load Z comprising a parallel network including a resistor 57, a capacitor 58, and a series connected inductor 59 and resistor 60 is connected between the base of transistor 45 and ground. In relative values, resistor 57 represents the value $R_s$ equal to the impedance seen at the collectors of transistors 34 and 35 of the modulator at the originating end of the network, capacitor 58 represents the combined capacitance $C_g$, the capacitance to ground of the network path, and $C_m$, the mutual capacitance between the network path and any other path in which crosstalk is to be reduced. Inductance 59 represents the value $(L - M)/2$ which is the inductance of the conductor linking the modulator and demodulator and resistor 60 represents the value ($R_x/2$) equal to the sum resistance of the crosspoints of the networks 30 and 40 and the resistance of the conductor referred to in the foregoing.

In describing a typical operation of a network arrangement according to this invention organized as considered in the foregoing, it will be assumed that the high impedance to low impedance transistion from the collectos of transistors 34 and 35 to the emitter of transistor 44 is accomplished as described in detail in the Laane patent cited hereinbefore. In that prior art arrangement, the voltage at point *a* indicated in the drawing, that is, at the emitter of transistor 44, is substantially zero as also indicated in the graph of FIG. 2 and, as a result, from an alternating current analysis, the voltage at the base of transistor 45, point *b*, will also be zero. The difference between points *a* and *b* are the two emitter-to-base diode voltage drops of transistors 44 and 45 which is negligible in the case of alternating current. Further, since very little current is present in the base of the latter transistor, the voltage across resistor 57 connecting the latter element to ground is very small.

With the incorporation of feedback circuitry according to this invention, a direct current $i_d$ is supplied by source 55 to the collectors of transistors 44 and 45 via resistor 54, diode 53, and resistor 56. A direct current $i_d'$ is also supplied by the source 55 to the emitter of transistor 50 of the feedback circuit and hence to ground via impedance network Z. The currents $i_d$ and $i_d'$ will be related by the ratio of the values of resistor 52 and the sum of the resistances of resistor 54, forward biased resistance of diode 53, and the resistance of resistor 56. Assuming the foregoing direct current conditions, when an alternating signal current $i_a$ appears at point *a*, consider that this current is opposite in direction to that of the direct current $i_d$. As a result, the dc voltage at that point. is positive and above ground and current $i_a$ is tending to decrease the value of the direct current $i_d$. When the alternating signal current $i_a$ decreases and if the impedance looking into the emitter of transistor 44 is negative, then the voltage at point *a* will be positive, i.e., the ac current and ac voltage are 180° out of phase and the impedance seen by signal current $i_a$ is thus negative. The total current at point *a* is the sum of current $i_a$ and $i_d$ and, since current $i_d'$ tracks current $i_d$, the current flowing to ground through impedance Z, the voltage at point *b* follows the current $i_d$. As a result, the voltage at point *a* tracks the current at that point but in opposite phase. As mentioned hereinbefore, the values of the elements forming the impedance network Z are selected so that the total impedance presented thereby is equal to the impedance of the entire communication path from the collector of transistor 35 at the other end of the switching network system. As a result, after the 180° phase shift produced at transistor 50, the absolute voltage at point *a* will very nearly equal the voltage at transistor 35 output. The conditions for cancelling the effects of crosstalk currents induced in the communication path of FIG. 3 as determined by the description of their origin in connection with FIG. 1 and 2, are thus met in the novel feedback arrangement of this invention.

The normal signal output from the path under consideration is taken via transformer 43 and transmitted to an output circuit 42. Resistor 56 connected across the primary winding of transformer 43 is chosen to ensure that a conventional 600 ohm impedance is presented to the output circuit 42.

In the foregoing what has been described is considered to be only one specific illustrative embodiment of the invention and it is to be understood that various and numerous other arrangements may be devised by one skilled in the art without departing from the spirit and scope thereof as defined by the accompanying claims.

What is claimed is:

1. In a communication system, in combination, a plurality of input transmission lines and a plurality of output transmission lines, each of said input and output lines having a predetermined impedance, a plurality of conducting paths for interconnecting said input and output transmission lines, and means for reducing interference with signals among said conducting paths comprising first circuit means for coupling a selected one of said input lines to one of said conducting paths, said first circuit means presenting an impedance to said one of said conducting paths greater than said predetermined impedance of said selected input line, and second circuit means for coupling said one of said conducting paths to a selected one of said output lines, said second circuit means presenting an impedance to said one of said conducting paths less than the predetermined impedance of said last-mentioned output line, and third circuit means for shifting the phase of an output voltage at said second circuit means substantially 180° from the phase of an input voltage at said first circuit means comprising feedback circuit means for returning a portion of an output signal back to said second circuit means, a phase inverting circuit means included in said feedback circuit means for inverting the phase of said output signal, and an impedance network associated with said second circuit means providing a return path for said portion of said output signal.

2. In a communication system, the combination according to claim 1, in which the impedance of said impedance network substantially equals the sum impedance of said one of said conducting paths.

3. A communication switching system comprising a plurality of selectable conducting paths through at least one switching network stage, each of said paths presenting a predetermined sum impedance, modulating means comprising a common-emitter transistor stage presenting a collector impedance to one end of a selected one of said conducting paths, an input signal on said selected conducting path applying a first voltage on said collector, demodulating means comprising a common-base transistor stage presenting an emitter impedance to the other end of said selected path, and means for applying a second voltage out of phase with said first voltage to said other end of said selected path responsive to said input signal comprising an effective negative impedance circuit including a current source, a phase inverter circuit, and an impedance network.

4. A communication switching system as claimed in claim 3 in which the impedance of said impedance network is substantially equal to said predetermined sum impedance of said selected conducting path.

5. A communication switching system as claimed in claim 3 in which said second voltage is substantially 180° out of phase with said first voltage.

6. A communication switching system comprising a first switching network for selectively connecting first conducting paths therethrough, a second switching network for selectively connecting second conducting paths therethrough, a plurality of junctors for interconnecting said first and second conducting paths, the impedance of a selected one of said first paths plus the impedance of a selected one of said second paths plus the impedance of a selected one of said junctors for interconnecting said last-mentioned first and second paths being equal to a predetermined sum impedance, modulating means comprising a common-emitter transistor stage presenting the impedance of a transistor collector to the input end of said selected first conducting path, an input signal on said input end establishing a first voltage on said collector, demodulating means comprising a common-base transistor stage presenting the impedance of a transistor emitter to the output end of said selected second conducting path, and means for reducing crosstalk between conducting paths of said first and second paths and between junctors comprising means for applying a second voltage substantially 180° out of phase with said first voltage responsive to said input signal comprising an effective negative impedance circuit including a current source, a phase inverter circuit, and an impedance network in the common-base circuit of said common-base transistor stage.

7. A communication system according to claim 6 in which said impedance network has an impedance substantially equal to said predetermined sum impedance.

8. A communicating system according to claim 7 in which said common-emitter and common-base transistor stages are of like conductivity type and the emitter current of said common-base stage constitutes the collector current of said common-emitter stage.

9. A communication system according to claim 8 in which said selected one of said first conducting paths through said first switching network and said selected one of said second conducting paths through said second switching network when interconnected by a selected one of said plurality of junctors comprise an unbalanced line.

10. In a switching network for selectively coupling signals between input and output circuits each having a standard impedance, an arrangement for reducing crosstalk between conducting paths in said network interconnecting said input and output circuits which comprises a first impedance network connected between an input circuit and a selected conducting path which presents an impedance to said selected path many times greater than said standard impedance, a second impedance network connected between said selected path and an output circuit which presents an impedance to said selected path many times lower than said standard impedance, and an effective negative impedance circuit associated with said second impedance network for establishing at said second impedance network a voltage equal in magnitude but opposite in phase to the voltage generated at said first impedance network by said signals, said effective negative impedance circuit comprising a third impedance network having an impedance equal to the sum impedance of said selected conducting path, and a pair of parallel circuits originating at a current source, one of said parallel circuits including said selected conducting path and the other of said parallel circuits including a phase inverter circuit and said third impedance network.

* * * * *